United States Patent [19]

Ikedo et al.

[11] Patent Number: 4,947,481
[45] Date of Patent: Aug. 7, 1990

[54] INFORMATION READER FOR DISK PLAYER

[75] Inventors: Yuji Ikedo; Takahiro Okajima; Yasuyuki Tashiro, all of Saitama, Japan

[73] Assignee: Pioneer Electronic Corporation, Tokyo, Japan

[21] Appl. No.: 188,342

[22] Filed: May 4, 1988

[30] Foreign Application Priority Data

| May 9, 1987 | [JP] | Japan | 62-113174 |
| May 9, 1987 | [JP] | Japan | 62-113175 |
| May 9, 1987 | [JP] | Japan | 62-113176 |

[51] Int. Cl.$^5$ .............................................. G11B 3/10
[52] U.S. Cl. ................................... 369/215; 369/223; 369/249
[58] Field of Search ............... 369/215, 219, 220, 221, 369/222, 226, 228, 244, 249, 255, 256, 223; 360/109

[56] References Cited

U.S. PATENT DOCUMENTS

| 2,515,273 | 7/1950 | Snepvangers | 369/249 |
| 4,342,109 | 7/1982 | Stewart | 369/249 |
| 4,410,922 | 10/1983 | Babow et al. | 360/109 |
| 4,788,677 | 11/1988 | Ikedo et al. | 369/249 |

Primary Examiner—Stuart S. Levy
Assistant Examiner—Kenneth B. Wells
Attorney, Agent, or Firm—Sughrue, Mion, Zinn, Macpeak & Seas

[57] ABSTRACT

A carriage movable on a pair of parallel guide members radially towards and away from a disk carrying surface of a turntable of a disk player, is constituted by first and second carrying members rotatably mounted to each other with the rotation axis of the second carrying member positioned perpendicular to the longitudinal direction of the guiding members and parallel to a guide plane containing the pair of guiding members so as to pass through a point where the second carrying member is in contact with the other guiding member. The carriage is provided with a differential screw screwed to the first and second carrying members to adjust the relative angular positioning between them. The carriage supporting an optical pickup is driven by a half nut provided on the carriage and a worm screwed to the half nut with the half nut movable within a plane containing the respective axes of the guiding members and the worm, relative to the carriage.

9 Claims, 5 Drawing Sheets

INFORMATION READER FOR DISK PLAYER

FIELD OF THE INVENTION

The present invention relates to an information reader for a disk player.

BACKGROUND OF THE INVENTION

FIG. 11 schematically shows a conventional information reader as positioned in a disk player. As shown in the drawing, a carriage 53 is provided with an optical pickup containing an objective lens 52 for radiating a laser beam onto a recording surface of a disk 51 mounted for rotation about its axis on a disk carrying surface 54 of a turntable 54. The carriage 53 is slidably supported by two laterally spaced guide shafts 55 which are disposed in parallel to the disk-carrying surface 54a of the turntable 54 and which serve as guiding members. A driving means (not shown) is provided to move the carriage 53 in opposite directions as per arrow A.

In the aforementioned information reader 53, the laser beam must be adjusted in two directions with respect to a recording track 51a of the disk 51, that is, the laser beam must be adjusted both in the tangential direction of the recording track and in the radial direction of the disk. Therefore, the carriage 53 or the turntable 54 must be rotatably adjusted relative to each other in the directions of the arrows T and R respectively, corresponding to the tangential and radial directions to thereby adjust the laser beam angular position. For example, the beam angular position is successively adjusted in two directions, or in other words, for example in the case where the adjustment in the direction of the arrow R is made after the adjustment in the direction of the arrow T; the T-direction angular position, once exactly adjusted, shifts out of its normal position again. Accordingly, in the conventional information reader, the adjusting procedure in the two directions must be repeated many times, and consequently, a long time is needed for the adjustment to work. Further, speculative adjustment in which the angular position is adjusted in one direction on speculation as to its divergence in the other direction, has been tried. However, a high degree of skill is required for such speculative adjustment.

For example, a portion of the carriage 53 where the optical pickup is carried is required to be relatively rotatable compared with other portions of the carriage 53, in the directions of the arrows T and R respectively corresponding to the tangential and radial directions. The rotatable portion of the carriage 53 has been designed to be gradually rotated relative to the other, stationary portions thereof by adjusting means to thereby finely adjust the angular position of the laser beam.

In the field of recent disk players for composite disks such as digital audio disks for recording information containing video information, low cost and highly-precise micro-adjustment have been required.

The carriage 53, FIG. 11, is slidably supported by guide shafts 55 which are disposed in parallel to a disk-carrying surface 54a of a turntable 54. A worm such as worm 56 of FIG. 3 may extend along the direction of movement of the carriage 53. The worm 56 is rotationally driven by a driving source. A half nut 53a is provided at a side end portion of the carriage 53 and screwed to the worm 56. In short, the carriage 53 is moved by the rotation of worm 56.

In the aforementioned construction, which, to the extent described may be found in the prior art, it is a basic principle that the guide members such as guide shaft 55 be parallel to the worm 56. If such parallel relation cannot be satisfied at the time of assembly, the worm 56 and the half nut 53a bite into each other obliquely and intensively with the movement of the carriage 53 so that the carriage 53 can lock up. To avoid such a condition, the parallel relation of the guide shaft 55 with the worm 56 must be established with very high precision, and consequently, at increased cost.

SUMMARY OF THE INVENTION

The present invention has been attained on the basis of such circumstances, and it is therefore an objection of the present invention to provide an information reader in a disk player, in which the beam angular position can be speedily and easily adjusted both in the tangential direction of the recording track and in the radial direction of the disk.

The information reader according to the invention is characterized in that a carriage is arranged to move on a pair of parallel guide members for carrying an optical pickup and is constituted by a first carrying member engaged with one of the guiding members at two points and a second carrying member is rotatably mounted at its one end to the first carrying member and is placed in contact at its other end with the other guiding member. Further, the rotation axis of the second carrying member is positioned perpendicular to the longitudinal direction of the guiding members and disposed in a guide plane containing the pair of guiding members, and caused to pass through a point where the second carrying member is in contact with the other guiding member.

It is therefore an object of the present invention to provide an information reader in which the incidence angle of a laser beam to a recording track in an information recording disk can be more finely adjusted with high precision.

The information reader according to the invention is arranged such that a carriage guided by a guiding means for carrying an optical pickup is constituted by a first member guided by the guiding means and a second member for carrying the optical pickup and capable of being positioned relative to the first member, and wherein the carriage is provided with a differential screw screwed to the first and second members so as to perform the relative positioning of the first and second members.

It is therefore another object of the present invention to provide a low-cost information reader.

The information reader according to yet a further aspect of the invention is arranged such that a carriage guided by a guiding member for carrying an optical pickup is driven by a half nut provided on the carriage and a worm screwed to the half nut with the half nut being movable within a plane containing the respective axes of the guiding members and the worm, relative to the carriage.

The information reader according to a further aspect of the invention is arranged such that a carriage as constituted by a first member guided by the guiding means and a second member for carrying the optical pickup is able to be adjustably positioned relative to the first member, with the carriage provided with a differential screw, screwed to the first and second members so as to perform the relative positioning of the first and second members.

Thus, the incident angle of the laser beam to the recording track of the information recording disk is adjusted by the differential screw as described above, so that more highly precise microadjustment can be made with a simple and inexpensive construction.

As described above in detail, the information reader according to yet a further aspect of the invention is arranged such that a carriage guided by a guiding member for carrying an optical pickup is driven by a half nut provided on the carriage and a worm in mesh with the half nut, the half nut being movable within a plane containing both the respective axes of the guiding members and the worm, relative to the carriage.

Accordingly, even in the case where the precision in the parallel relation of the guiding members with the worm is low for the purpose of reduction of cost, the half nut or carriage can move smoothly over the whole length of the worm.

DETAILED DESCRIPTION OF THE PREFERRED EMBODIMENTS

Embodiments of the information reader according to the present invention will be described in detail with reference to the accompanying drawings.

Figure 1:
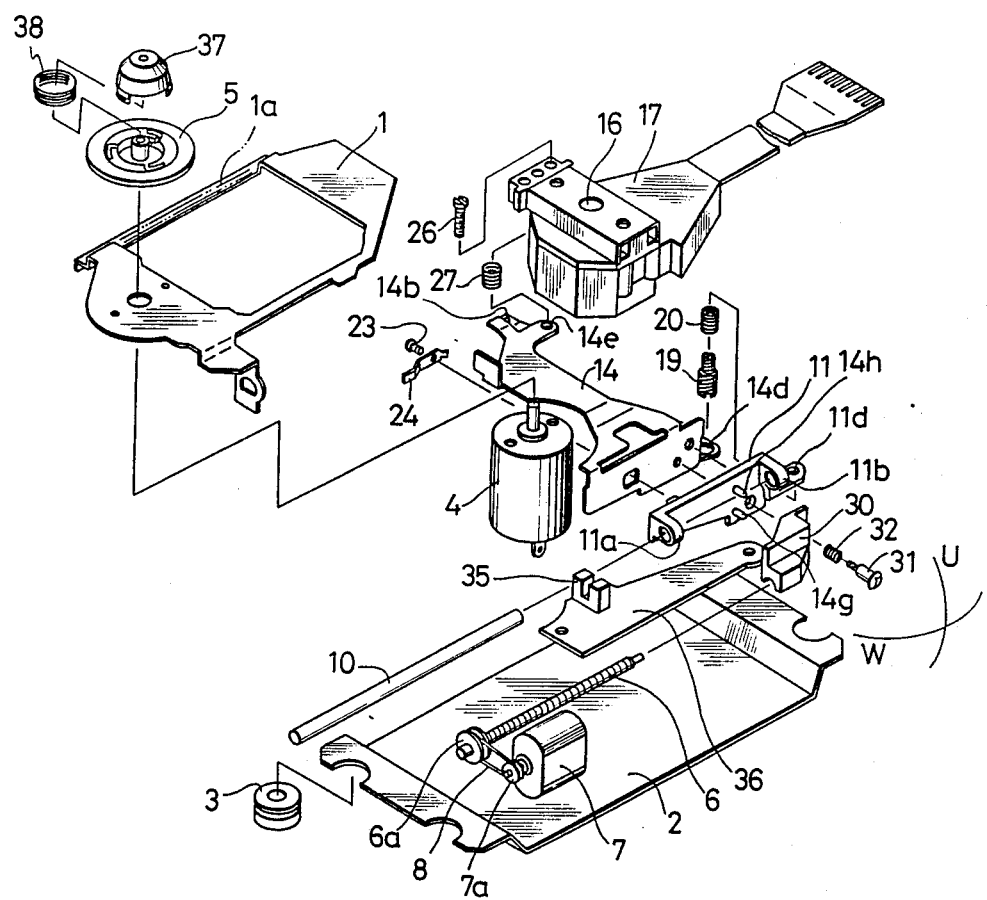
FIG. 1 is an exploded view of an information reader for a disk player forming a preferred embodiment of the present invention.
Figure 2:
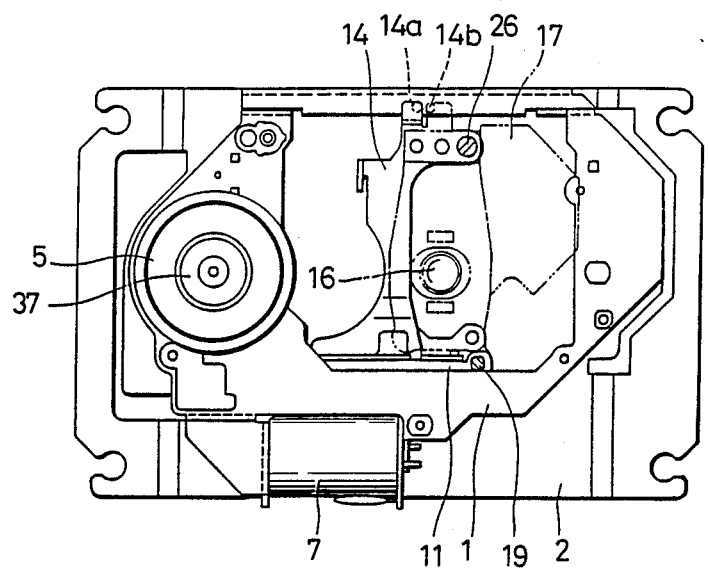
FIG. 2 is a top plan view of the information reader of FIG. 1.
Figure 3:
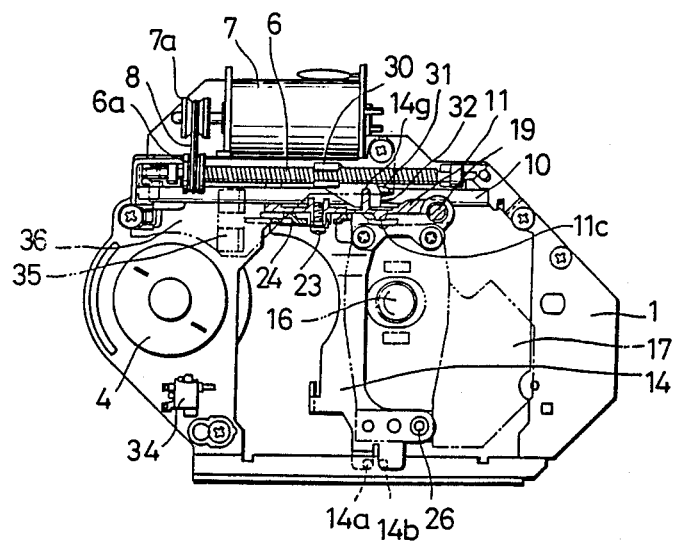
FIG. 3 is a bottom view, partially in section, of the information reader of FIGS. 1 and 3.

As shown in FIGS. 1 and 2, the information reader includes a supporting mechanism composed of a mechanism chassis 1 and a base plate 2 which are arranged in parallel to each other. The mechanism chassis 1 acts to carry parts which will be described later, and the base plate 2 is connected to the mechanism chassis 1 by screws or the like and mainly acts as a ballast weight to increase mass and lower the center of gravity as the whole of the information reader. Therefore, the base plate 2 is preferably formed of a relatively thick steel plate. The base plate 2 is attached to a player housing (not shown) through a vibration-insulating member 3 formed of rubber by screws or bolts (not shown). As shown in FIG. 3, a spindle motor 4 and a turntable 5, directly rotationally driven by the spindle motor 4, are attached to the mechanism chassis 1, so that the mechanism chassis 1 and the base plate 2 are separated from each other at a predetermined distance in a direction perpendicular to disk-carrying surface of a turntable 5.

A worm 6 parallel to the disk-carrying surface of the turntable 5 is disposed between the mechanism chassis 1 and the base plate 2 and rotatably attached to the mechanism chassis 1. A motor 7 is provided on the mechanism chassis 1 to the side of the worm 6. A pulley 7a is fitted onto an output shaft of the motor 7 and a belt 8 is engaged between the pulley 7a and a second pulley 6a, fitted onto an end portion of the worm 6.

Figure 5:
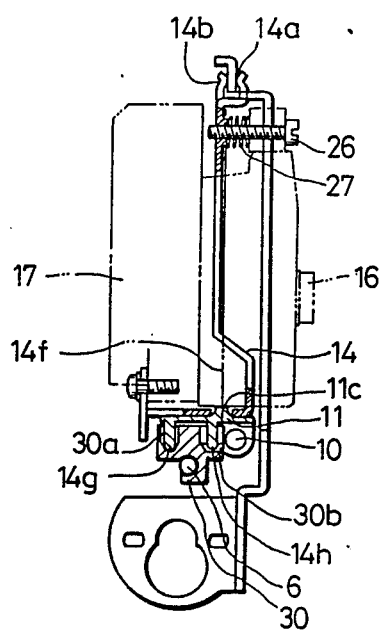
FIG. 5 is a side elevational view, partially broken away, of a portion of the information reader of FIG. 1.
Figure 4:
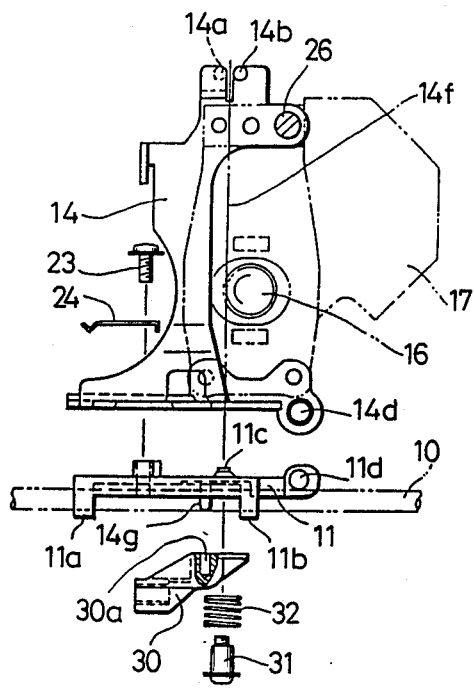
FIG. 4 is an exploded view of a portion of the information reader of FIGS. 1 through 3, inclusive.
Figure 6:
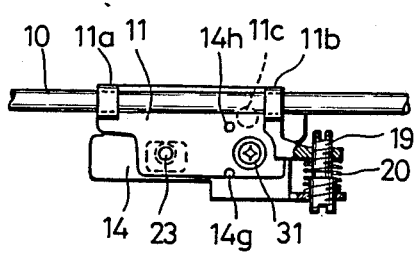
FIG. 6 is a side elevational view, partially broken away, of the double screw adjusting means for the first and second carrying members of the carriage of the information reader of FIG. 1.

A guide shaft 10 forms one guiding member and is disposed in parallel to the worm 6 and supported at its opposite ends by the mechanism chassis 1. As shown in FIGS. 4 through 6, a first carrying member 11 is slidably supported by the guide shaft 10. The first carrying member 11 is connected to the guide shaft 10 at two points via projections 11a and 11b. As shown in FIGS. 3 through 6, the first carrying member 11 is provided with a projection 11c to which a second carrying member 14 is rotatably attached at one end portion thereof. It is apparent, particularly from FIGS. 4 and 5, that the second carrying member 14 is provided with a pair of small semispherical projections 14a and 14b formed opposite to each other, at a notch, at the other end portion of the second carrying member 14. The pair of semispherical projections 14a and 14b are slidably in contact along a guide path 1a (FIG. 1) which is provided parallel to the guide shaft 10, with the mechanism chassis 1 sandwiched between the pair of semispherical projections in the direction of its thickness. In short, the mechanism chassis 1 also acts as a second guiding member for guiding the second carrying member 14 during movement along guide shaft. The pair of semispherical projections 14a and 14b are arranged near to each other and opposite to each other, and consequently, the other end portion of the second carrying member 14 is in contact with the guide path 1a of the mechanism chassis 1, at substantially one point.

The first carrying member 11 and the second carrying member 14 make up a carriage carrying an optical pickup 17 including an objective lens 16. The optical pickup 17 is attached to the second carrying member 14.

As shown in FIGS. 1 and 4, screw holes 11d and 14d corresponding to each other are respectively formed in the first and second carrying members 11 and 14. As shown in FIGS. 1 through 3 and FIG. 6, a differential screw 19 has two axial portions of different pitch respectively screwed into the screw holes 11d and 14d. A coil spring 20 is interposed in a compressed state between the screw holes 11d and 14d and concentrically fitted onto the differential screw 19. Accordingly, by rotating the differential screw 19, the second carrying member 14 rotates round the projection 11c of the first carrying member 11 functions as a rotational axis relative to the first carrying member 11, so that the optical pickup 17 on the second carrying member 14 is inclined to thereby adjust the angular position of the laser beam in the radial direction of the information recording disk 21, FIG. 7, with respect to the recording track thereof.

For example, the pitches spirally formed in the differential screw 9 may be 0.5 (mm) and 0.7 (mm). The first and second carrying members 11 and 14 respectively fitted to the differential screw approach each other or depart from each other, by 0.2 mm, every time the differential screw 19 makes one turn. As shown in FIGS. 1, 3, 4 and 6, a screw 23 and a plate spring 24 are provided to press the second carrying member 14 against the first carrying member 11.

Figure 7:
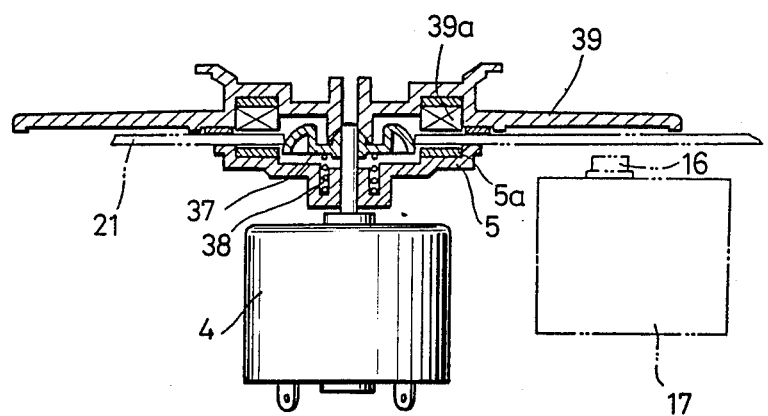
FIG. 7 is a side elevational view of the turntable of the disk player employing the information reader in accordance with the present invention, with the clamp mechanism in section.

As shown in FIGS. 1 through 5, a screw-insertion hole 17a is formed in a side end of a body portion of the optical pickup 17, so that an adjustment screw 26 can be inserted into the screw-insertion hole 17a. The adjustment screw 26 is also fitted into a screw hole 14e (FIG. 1) formed in the second carrying member 14. As shown in FIGS. 1 and 5, a coil spring 27 is interposed in a compressed state between, the body portion of the optical pickup 17 and the second carrying member 14. Accordingly, by rotating the adjustment screw 26, the optical pickup 17 is inclined to thereby adjust the angular position of the laser beam in the tangential direction of the recording track with respect to the recording track of the information recording disk 21, (FIG. 7).

It is apparent from FIGS. 4 and 5 that the rotation axis 14f of the second carrying member 14 is perpendicular to the longitudinal direction of the guide shaft 10 as a guiding member, that is, perpendicular to the longitudinal direction of the guide path 1a (shown in FIG. 1) of the mechanism chassis 1, and that the rotational axis 14f is parallel to a virtual guide plane containing both the guide shaft 10 and the guide path 1a, and passes through a point at which the second carrying member 14 is in contact with the guide path 1a. According to the aforementioned arrangement, the angular position of the laser beam with respect to the recording track of the information recording disk can be adjusted respectively in the two tangential and radial directions without interference.

Figure 8:
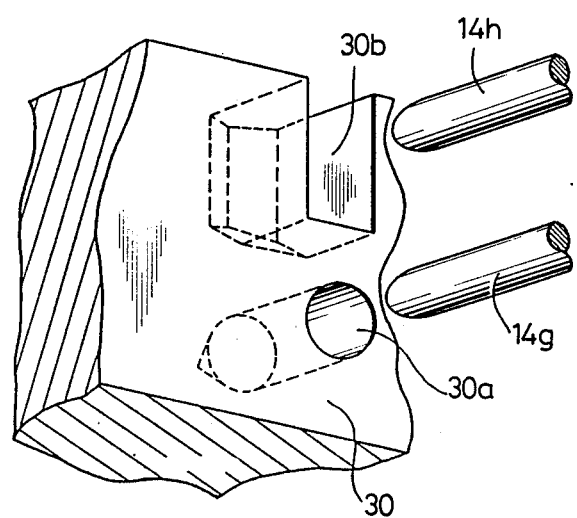
FIG. 8 is an exploded enlarged, perspective view of a portion of the half nut and projections of the first carrying member of the information reader carriage.

As shown in FIGS. 1 and 3 through 5, a half nut 30 is attached to the first carrying member 11 by a screw 31 with a coil spring 32. The half nut 30 is screwed to the worm 6 so that the aforementioned carriage including the first carrying member 11 can be moved along the guide shaft 10 by the rotation of the worm 6 upon the rotation of the motor 7. As shown in FIG. 8, the second carrying member 14 has a sharp-headed projection 14g which is fitted into a conical-bottomed concavity 30a formed in the half nut 30, so that the half nut 30 can swing freely along a spherical plane containing two arcs, U and W, FIG. 1. Further, the second carrying member 14 has another sharp-headed projection 14h disposed in parallel to the sharp-headed projection 14g. The sharp-headed projection 14h is fitted into a roof-shape-bottomed concavity 30b which is formed in the half nut 30 so as to extend along the arc U. The width of the concavity 30b, that is, the size of the concavity 30b in the direction W, FIG. 1, is made slightly larger than the diameter of the sharp-headed projection 14h, so that that motion of the half nut 30 along the arc W is limited, in other words, the half nut 30 can be moved only along the arc U. In short, the half nut 30 is movable along a plane at least containing the center axis of the guide shaft 10 and the center axis of worm 6.

As shown in FIG. 3, a detection switch 34 is provided in the lower surface of the mechanism chassis 1 in order to detect the optical pickup 17 coming to a position corresponding to the read-in track of the information recording disk 21. Also as shown in FIG. 1, an area sensor 35 is attached to the mechanism chassis 1 through a wiring substrate 36 in order to detect whether the optical pickup 17 is within an area corresponding to a predetermined position (picture area) of the information recording disk 21.

As shown in FIGS. 1, 2, and 7, a centering ring 37, fitted into the center hole of the information recording disk 21 for the purpose of centering the disk, is detachably provided in the turntable 5. Further, the centering ring 37 is provided with a coil spring 38 for providing a biasing force to the centering ring so that the centering ring 37 is manually projected away from the turntable. In FIG. 7 the reference numeral 39 designates a disk-like pressing member which presses the information recording disk 21 against the turntable 5 and serves as a disk clamp. The disk-like pressing member 39 has an annular magnet 39a by which an annular magnetic member 5a provided in the turntable 5 is attracted to perform disk clamping.

Figure 9:
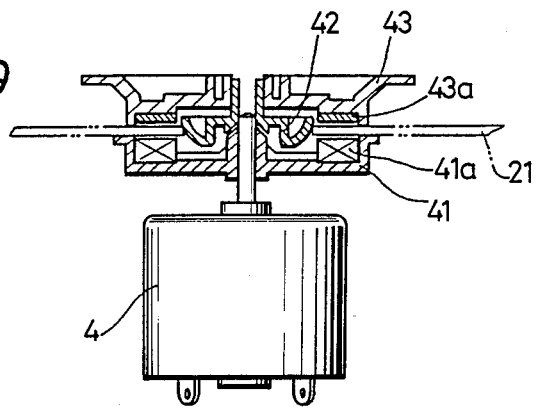
FIG. 9 is a side elevational view of the turntable employed with the information reader according to the present invention, with an alternate form of disk clamping mechanism shown in section.

FIG. 9 shows another embodiment as a partial modification of the embodiment of FIG. 8. As shown in the drawing, a centering ring 42, fitted into the center hole of the information recording disk 21 for the purpose of centering the disk against a turntable 41, is provided in a disklike pressing member 43. Further, the turntable 41 is provided with an annular magnet 41a, and the pressing member 43 is provided with an annular magnetic member, alignable with and attracted by the magnet.

Figure 10:
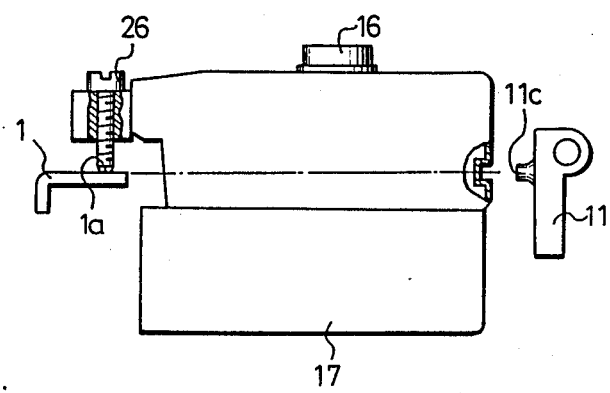
FIG. 10 is an elevational view, partially broken away, of an optical pickup of the information reader in accordance with the present invention.
Figure 11:
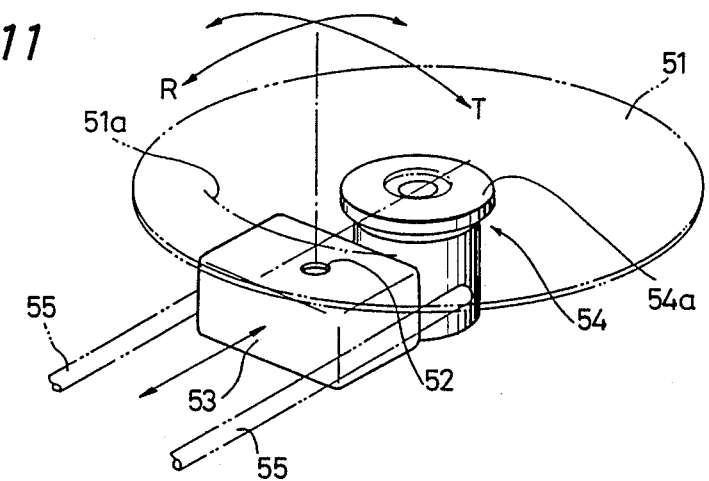
FIG. 11 is a perspective view of a conventional information reader.

Although in the aforementioned embodiments, the optical pickup is fixed to the second carrying member 14, the invention is applicable to the case where the optical pickup is integrally provided with the second carrying member 14 to form one body, if dimensional conditions permit. In this case, the top end of the adjustment screw 26 is brought into direct contact with the chassis defining guide path 1a as shown in FIG. 10. It is a matter of course that the top end of the adjustment screw 26 is arranged on the rotational axis of the projection 11c of the first carrying member 11.

As described above in detail, the information reader according to one aspect of the invention is arranged such that a carriage, arranged to move on a pair of parallel guide members and carrying an optical pickup, is constituted by a first carrying member engaged with one of the guiding members at two points and a second carrying member is rotatably mounted at one end thereof to the first carrying member and is caused to be in contact, at its other end, with the other guiding member, wherein the rotation axis of the second carrying member is perpendicular to the longitudinal direction of the guiding members, parallel to a guide plane containing the pair of guiding members, and passes through a point where the second carrying member is in contact with the other guiding member.

According to the aforementioned arrangement, the angular position of the laser beam with respect to the recording rack of the information recording disk can be adjusted respectively in two directions, that is, in the radial direction of the disk, without interference. Consequently, the laser beam angular position can be speedily and easily adjusted in the two directions without the need of high skill.

What is claimed is:

1. An information reader for a disk player having a turntable for supporting a disk on a surface thereof, said information reader comprising:
 a carriage for carrying an optical pickup;

a carriage guiding means for guiding said carriage; and a driving means for moving said carriage along said guiding means, said guiding means being constituted by a pair of parallel guiding members extending radially of said turntable, said carriage having a first carrying member in contact with one of said guiding members at two points and a second carrying member rotatably attached at one portion thereof to said first carrying member and in contact at another portion thereof with the other one of said guiding members, said second carrying member having a rotational axis perpendicular to the longitudinal direction of said guiding members, disposed in a guide plane containing said pair of guiding members, and passing through a point where said second carrying member contacts said other guiding member.

2. An information reader for a disk player having a turntable for supporting a disk on a surface thereof, said information reader comprising:

a carriage for carrying an optical pickup, a guide means for guiding said carriage, and a driving means for moving said carriage radially towards and away from said turntable along said guiding means, said carriage having a first member guided by said guiding means and a second member, said second member carrying said optical pickup, means for movably connecting said second member to said first member, and a differential screw screwed to said first and second members to permit adjustable positioning of said first member relative to said second member so as to adjust the angular position of said optical pickup in a radial direction of the disk.

3. An information reader for a disk player having a turntable for supporting a disk on a surface thereof, said information reader comprising:

a carriage for carrying an optical pickup;

a guiding means for guiding said carriage; and driving means for moving said carriage along said guiding means, said guiding means being constituted by a pair of parallel guiding members extending radially of said turntable, said driving means including a worm extending in the direction of said guiding members for guiding said carriage, a worm driving means for rotating said worm, a half nut provided on said carriage and screwed to said worm, and means for permitting movement of said half nut, such that said half nut is pivotably moved through said carriage with respect to one of said guiding members.

4. An information reader according to claim 3, wherein a sharp-headed projection is formed on one of said carriage and said half nut and engaging a conical concavity formed within the other one of said carriage and said half nut.

5. The information reader of claim 1, wherein said optical pickup is attached to said second carrying member.

6. The information reader of claim 5, further comprising means for angularly adjusting said optical pickup with respect to said second carrying member.

7. The information reader of claim 2, wherein said optical pickup is adjustably attached to said second carrying member.

8. The information reader of claim 7, further comprising means for angularly adjusting said optical pickup with respect to said second carrying member.

9. The information reader according to claim 2, said carriage further having a coil spring being interposed in a compressed state between said first member and said second member and being concentrically fitted onto said differential screw.

* * * * *